Jan. 7, 1958  C. E. CRIST  2,818,977
FILTER BOTTOMS
Filed April 8, 1955  2 Sheets-Sheet 1

INVENTOR.
CHESTER E. CRIST
BY
ATTORNEYS

Jan. 7, 1958
C. E. CRIST
2,818,977
FILTER BOTTOMS
Filed April 8, 1955
2 Sheets-Sheet 2
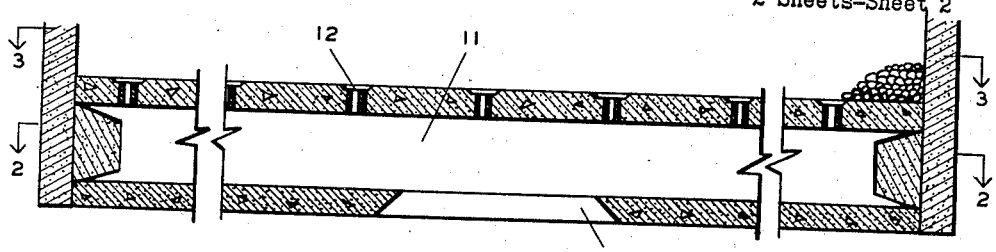
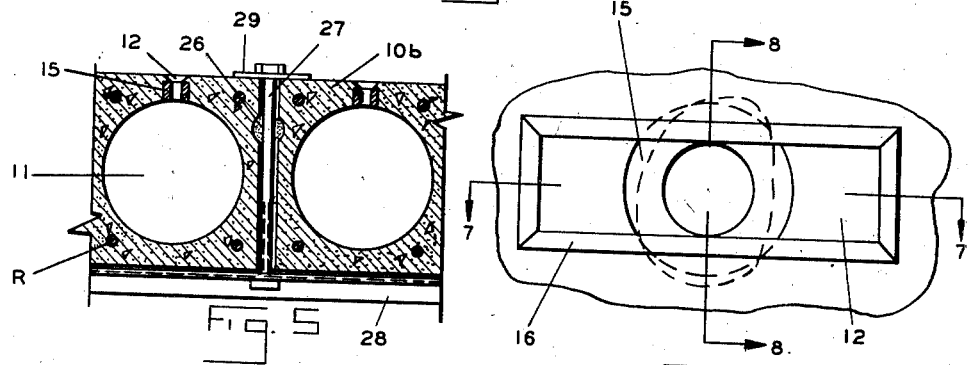
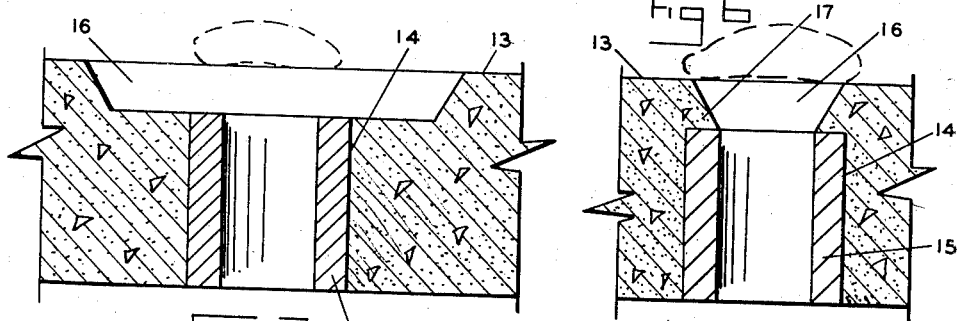
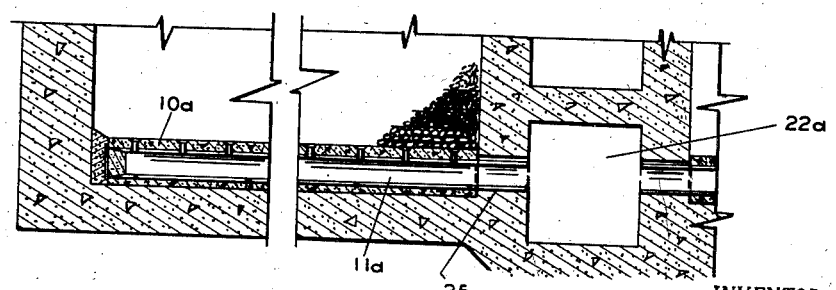
INVENTOR.
CHESTER E. CRIST
BY
ATTORNEYS

United States Patent Office 2,818,977
Patented Jan. 7, 1958

2,818,977

FILTER BOTTOMS

Chester E. Crist, Columbus, Ohio, assignor to Robert F. McGivern, Columbus, Ohio Application April 8, 1955, Serial No. 500,201

2 Claims. (Cl. 210—291)

My invention relates to filter bottoms. It has to do, more specifically, with a filter bottom structure for the rapid sand type filter having an underdrain system.

Filter bottoms are used in water-purification systems to support a filter or leaching bed consisting of sand, gravel, etc. These bottoms are usually formed of metal pipe, having a plurality of apertures for collecting the water as it seeps down through the filter bed, which will conduct the purified water to a suitable point of storage or use. At regular intervals, it is necessary to force wash-water under considerable pressure back through the pipe and out through the apertures to clean the filter bed so that an efficient leaching through the filter bed will be maintained.

According to my invention I provide a filter bottom which is formed of precast conduit sections of concrete in the form of a monolith or integral slab. The conduits of these sections are provided with openings which are fitted with nozzle liners of non-ferrous material. These openings are uniformly arranged along the conduits so that uniform drainage of water from the filter bed, which the conduits support, and equal distribution of wash water will result.

In the accompanying drawings I have illustrated examples of filter beds employing my invention. In these drawings:

Figure 4 is a vertical longitudinal sectional view through the filter bottom taken substantially along line 4—4 of Figure 3.

Figure 5 is a transverse sectional view through two of the monoliths or slabs disposed side-by-side and illustrating how they may be held down.

Figure 6 is a plan view of one of the nozzle recesses and liners used in the conduits of the filter bottom.

Figure 7 is a longitudinal vertical sectional view taken through the nozzle recess and liner along line 7—7 of Figure 6.

Figure 8 is a transverse vertical sectional view taken along line 8—8 of Figure 6 through the nozzle recess and liner and at right angles to the section of Figure 7.

Figure 9 is a vertical longitudinal sectional view illustrating a different type of filter tank.

Figure 1:
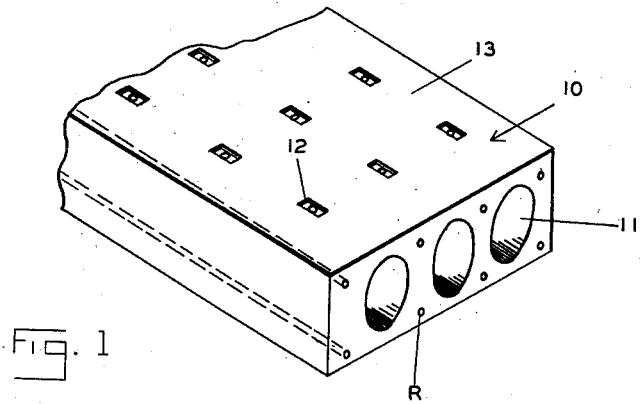
Figure 1 is an isometric view of one of the cast monoliths or slabs used for the filter bottom.
Figure 2:
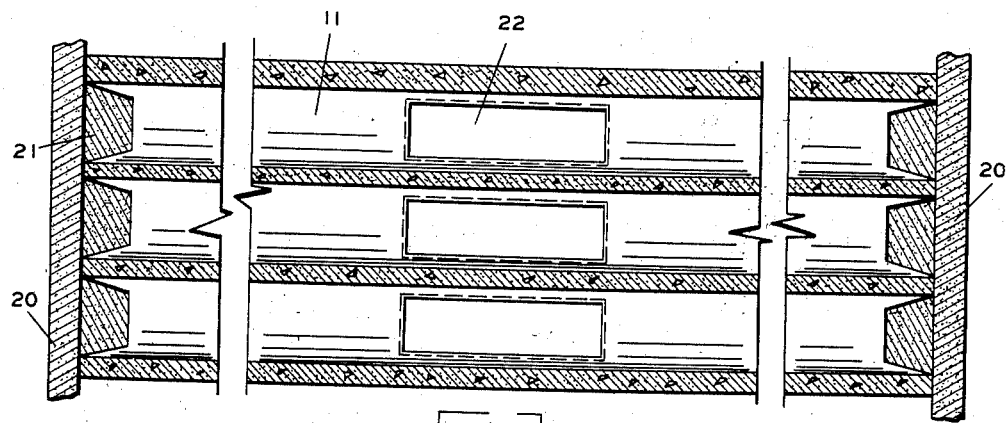
Figure 2 is a horizontal sectional view showing a filter bottom in one type of tank using a monolith or slab similar to that illustrated in Figure 1, the section being taken substantially along line 2—2 of Figure 4.
Figure 3:
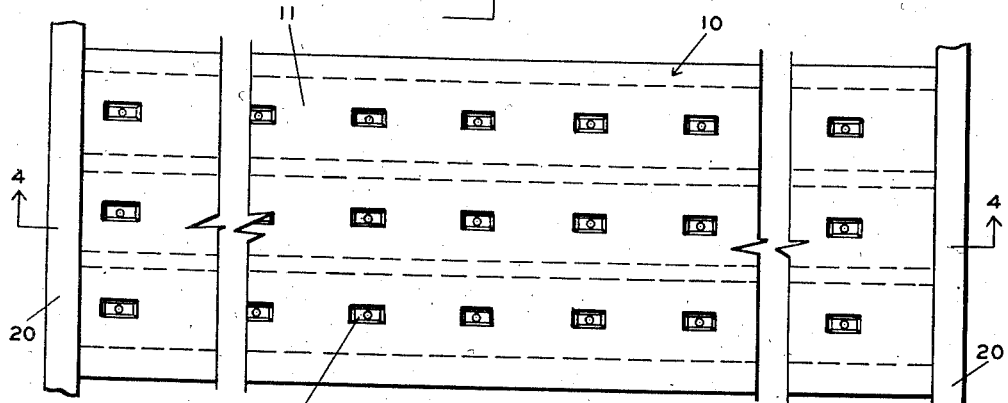
Figure 3 is a plan view of the filter bottom taken substantially along line 3—3 of Figure 4.

With reference to the drawings, in Figure 1, I have illustrated a filter bed conduit of the type to be used in forming the filter bed and consisting of a precast, prestressed, integral, monolith or slab 10 of reinforced concrete. The reinforcing rods R extend the full length of the unit. The monolith 10 is shown as being provided with three longitudinal passageways 11 extending the full length thereof but it may be provided with a lesser or greater number of passageways as desired.

Each conduit passageway 11 is provided with a plurality of nozzles 12 which are formed at the upper side 13 of the monolith 10, being arranged in rows of longitudinally spaced nozzles which communicate with the respective conduit passageways 11 at their upper sides.

The nozzles 12 are formed by casting the concrete around the vertical liners 15 (Figures 6, 7 and 8) which are of circular cross-section and which are of non-ferrous material such as plastic, ceramic, aluminum or other non-ferrous material. The sockets 14 in which the liners 15 are disposed extend upwardly from the top surface of each conduit passageway 11 but not entirely through the upper wall of the monolith as shown in Figures 7 and 8. Each socket 14 communicates at its upper end with an elongated recess 16 formed in the upper surface 13 of the monolith, all the walls of the recess tapering inwardly. It will be obvious from Figure 8 that the width of the recess 16 at its lower side is less than the outside diameter of the liner 15 but is the same as its internal diameter. The result is that a shoulder 17 is provided at each side of the recess 16 which engages the top of the liner 15 to prevent it from blowing out upwardly from the socket 14 during back-washing of the conduits as will be explained later. Each bore 14 is disposed midway of the length of its associated recess 16. This arrangement of nozzle recesses 16 and nozzle liners 15 not only prevents blowing out of the liners but seating of the large stones, which are at the bottom of the filter bed, on the upper ends of the liners. As indicated in Figures 6, 7 and 8, the recess 16 is wider than the diameter of the large gravel which is used at the bottom of the filter bed. Thus, the gravel will bridge this recess and will not seat on and seal the upper end of the liner and since the recess 16 is elongated the water can still pass down around the stone and reach the port provided by the liner. The tapering sides of the recess 16 will permit build-up of some lime deposit without extending over the upper end of the liner 15.

In Figures 1 to 4, I show one of the monoliths 10 forming a filter bottom, used in a center flume type filter. The monolith 10 extends between the walls or bulkheads 20 of the filter tank. These walls are provided with plugs 21 at proper intervals which extend into and close the ends of the conduit passageways 11. In the filter tank shown in Figures 1 to 4, the passageways 11 are provided with influent and effluent ports 22 intermediate the ends of the passageways 11 and at the lower side thereof. Those ports are used for withdrawing the filtered effluent and as washwater flumes for forcing water under pressure back through the passageways 11 and out through the nozzles 12 to clean the nozzles.

In Figure 9, I have illustrated an end flume type filter in which the effluent and washwater flumes 22a are provided at the end of the filter bottom rather than intermediate the ends as previously described. The flumes 22a are connected by sleeves 25 to the one end of each of the passageways 11a of the monolith 10a which forms the filter bottom.

In each example illustrated the bottom supports the filter bed and extends from one wall thereof to the other. Any area of bottom may be provided by disposing selected numbers of monolith sections 10 or 10a side-by-side. When several sections are used in a center flume filter tank of the type shown in Figures 1 to 4 the sections are held down, against pressure developed during back-washing, as shown in Figure 5. Thus in Figure 5 two sections 10b are shown side-by-side and the joint therebetween is sealed by grout, longitudinally extending sealing grooves 26 being formed in the adjacent surfaces thereof if desired. Anchoring bolts 27 may be provided at longitudinally spaced intervals between the sections 10b, being anchored at their lower ends to transverse aligning angles 28 which engage the lower surfaces of the sections and, in turn, are suitably anchored in the tank. The bolts 27 are provided with large washers 29 at their upper ends which engage the adjacent top surfaces of the sections 10b. Thus, with this arrangement the sections 10b will be held down in sealed side-by-side relationship during backwashing under pressure through the center flumes 22. Anchoring means for the monolith sections are not needed in the end-flume type of filter tank shown in Figure 9.

This type of filter bottom being formed from one or more monoliths or slabs of precast, prestressed, reinforced concrete will have structural strength for supporting the filter bed since it will span the entire width of the filter in one piece and will function as a box girder or beam. False bottoms or other supports are not required. Furthermore, because it is formed as indicated it will have the structural strength to resist high internal pressures. Uniform drainage and equal distribution of the washwater will be provided by the described arrangement of conduits and nozzles. Since the monolith is formed of concrete and the nozzle liners are formed of non-ferrous materials, the entire bottom will be immune to corrosion, electrolysis, and tuberculation. Since the monolithic unit is of precast and prestressed, reinforced concrete, it will resist "blow-up" as indicated above and since the nozzle liners are anchored in the concrete as described, there will be no danger of them being blown out of the nozzles. Minimum depth will be required for the filter bottom. Material and installation cost will be at a minimum compared to other filter bottom constructions.

Various other advantages will be apparent.

Having thus described my invention, what I claim is:

1. A filter bottom comprising a filter bed supporting member having a conduit passageway formed therein and provided with an effluent and influent port, and a plurality of nozzle openings at spaced intervals in the top wall of said member and communicating with said conduit passageway, each of the nozzle openings being in the form of a vertical nozzle port which communicates at its upper end with an elongated recess formed in and below the supporting surface of said member, said elongated recess being of substantially greater length than the corresponding dimension of the nozzle port with the nozzle port located intermediate the length thereof and being of a width less than the diameter of the large gravel which is adapted to be supported on said supporting surface to prevent the gravel from entering the recess and thereby seating on and sealing the upper end of said nozzle port.

2. A filter bottom comprising a filter bed supporting member having a conduit passageway formed therein and provided with an effluent and influent port, and a plurality of nozzle openings at spaced intervals in the top wall of said member and communicating with said conduit passageway, each of the nozzle openings being in the form of a vertical nozzle port which communicates at its upper end with an elongated recess formed in and below the supporting surface of said member, said elongated recess being of substantially greater length than the corresponding dimension of the nozzle port with the nozzle port located intermediate the length thereof and being of a width less than the diameter of the large gravel which is adapted to be supported on said supporting surface to prevent the gravel from entering the recess and thereby seating on and sealing the upper end of said nozzle port, said nozzle port being of circular cross-section and having a non-ferrous liner of sleeve form disposed therein, said elongated recess having walls which angle inwardly so that the recess is wider at its mouth and being of a width at its lower side less than the outside diameter of said liner to provide a retaining shoulder engaging the upper end of said liner.

References Cited in the file of this patent

UNITED STATES PATENTS

| | | |
|---|---|---|
| 1,151,313 | Wheeler | Aug. 24, 1915 |
| 1,429,477 | Williamson | Sept. 19, 1922 |
| 1,569,896 | Tanner | Jan. 19, 1926 |
| 2,648,439 | Miller | Aug. 11, 1953 |